United States Patent [19]

Müller

[11] 4,420,654

[45] Dec. 13, 1983

[54] CABLE SLEEVE SEALING ASSEMBLY

[76] Inventor: Siegfried Müller, Vollmannstr. 25, 5800 Hagen 8, Fed. Rep. of Germany

[21] Appl. No.: 347,049

[22] Filed: Feb. 8, 1982

Related U.S. Application Data

[63] Continuation of Ser. No. 127,857, Mar. 6, 1980.

[30] Foreign Application Priority Data

Mar. 14, 1979 [DE] Fed. Rep. of Germany ........ 2909979
Jul. 11, 1979 [DE] Fed. Rep. of Germany ........ 2927878

[51] Int. Cl.³ .......................................... H02G 15/196
[52] U.S. Cl. ................................. 174/92; 174/DIG. 8; 428/36
[58] Field of Search ............................ 174/92, DIG. 8; 138/156–169; 428/36; 156/86

[56] References Cited

U.S. PATENT DOCUMENTS 2,771,502 11/1956 King et al. ..................... 174/88 R X
4,219,051 8/1980 D'Haeyer ...................... 174/DIG. 8

FOREIGN PATENT DOCUMENTS 2906408 10/1979 Fed. Rep. of Germany ........ 174/92
2820181 11/1979 Fed. Rep. of Germany ........ 174/92
2422275 12/1979 France .................................. 174/92

*Primary Examiner*—A. T. Grimley
*Assistant Examiner*—D. A. Tone
*Attorney, Agent, or Firm*—Toren, McGeady and Stanger

[57] ABSTRACT

A sealing assembly particularly for cables including an essentially tubular slotted casing formed of thermally shrinkable material having a pair of longitudinal edges with protuberant fastening elements extending in a direction generally longitudinally of said slotted casing being provided adjacent each of said longitudinal edges. A clamping element preferably of a C-shaped configuration is provided for holding together the longitudinal edges of the slotted casing. The clamping element is loosely engaged on the fastening elements in the assembly position thereof and rigidly clamped thereon in the operative condition of the assembly.

8 Claims, 3 Drawing Figures

CABLE SLEEVE SEALING ASSEMBLY

This is a continuation of Ser. No. 127,857, filed Mar. 6, 1980.

The present invention relates generally to seal devices particularly for insulated cables and more specifically to a device for effecting a seal at the points of connection of a generally tubular continuous object, particularly a cable sleeve. More specifically, the invention relates to a sealing assembly including a tubular slotted casing of thermally shrinkable material having longitudinal edges which are held together by means of a clamping element.

Devices of the type to which the present invention relates are known in the prior art, for example German Offenlegungsschrift No. 26 53 940 or German Pat. No. 1,525,815. In these known devices, longitudinal edges are provided with outwardly facing fastening protuberances which may be held together by means of a C-shaped clamping element. In one prior art device, there is provided a helical spring which can be turned or screwed into the fastening protuberances or bulges in order to achieve the necessary tightness or proper fit in the shrinking procedure. In the second case, an extreme force or clamp fit of the clamping element is required. In both types of fastening assemblies, disadvantages arise with respect to the assembly because there is either required additional work steps or because the procedure of sliding the clmping rail on the assembly is particularly difficult.

The present invention is directed toward the provision of a solution which will significantly simplify the assembly of a device of the type involved and which will also simplify the manufacture of a slotted casing of the device wherein good support of the longitudinal edges of the casing may be insured.

SUMMARY OF THE INVENTION

Briefly, the present invention may be described as a sealing assembly particularly for insulated cables comprising an essentially tubular slotted casing formed of thermally shrinkable material and having a pair of longitudinal edges, means defining adjacent each of said longitudinal edges protruberant fastening elements or bulges extending in a direction generally longitudinally of the slotted casing, and a C-shaped clamping element for holding together the longitudinal edges of the slotted casing, the C-shaped clamping element operating to loosely engage the fastening elements or bulges in the assembly position of the device and to rigidly clamp the fastening elements in the operative condition of the assembly.

Thus, in accordance with the present invention, the casing is provided at its longitudinal edge regions with fastening elements which may be formed in the shape of fastening ribs, bulges, webs or the like. These fastening elements may face the interior of the casing. The fastening elements are loosely engaged by the C-shaped element in the position of assembly and they are tightly clamped together by this element in the position of operation.

When the C-shaped clamping element is placed in the interior of the sealing assembly, the clamping or restraining forces generated during the shrinkage procedures are also utilized directly for fastening of the casing by virtue of the fact that, due to the shrinkage behavior of the casing, the casing will immediately join with the outer wall of the C-shaped element to enhance the clamping effect thereof due to forces generated by the shrinking casing so that an additional resistance against dislodging of the shrinking foil out of this element will be achieved in an especially advantageous manner. If the forces generated during shrinkage are relatively high, the accumulation of material in the interior of the C-shaped element will create a countervailing effect so that dislodgement will be avoided. Simultaneously, a separate force fit of the C-shaped element at the edge regions of the casing becomes unnecessary and as a result the assembly procedures become simplified.

In a further development of the invention, it is provided that the casing is formed with a constant thickness and that the fastening elements or bulges are constructed as two indentations of different size so that the smaller of the two bulges may be engaged with a snap fit into the larger bulge in order to connect the two longitudinal edges of the slotted casing together.

As a result of the design of the present invention, an especially simple production and assembly procedure of the casing is possible. The shapes involved may be easily obtained since the casing may be extruded. Dies for forming the bulges along the edge regions of the casing with different sizes may be easily removed from the casing before it is ultimately cooled even when the bulges are of a configuration involving an uncut shape or a back-tapering orientation. Because these elements in accordance with state of the art techniques require reinforced or thickened edge bulges or the like and also because particular care in the manufacture with respect to very exact calibration is required due to the necessity of having to exactly press together without a gap the back surfaces of the edge bulges or the like, the advantages indicated will be achieved.

Furthermore, it is advantageous if within the smaller bulge of the assembly there is provided a support element which may preferably be inserted by sliding from the side of the assembly in order to prevent the casing edges from becoming dislodged from the gap of the C-shaped element during the shrinkage procedure.

In order to facilitate development of an especially strong support for the longitudinal edges of the casing even in extreme cases, it is provided in accordance with the invention to form the diameter of the support element larger than the width of the gap of the C-shaped element. This will insure that even at the beginning of the shrinking procedure in this region the overlapping casing edges will be clamped at the C-shaped element with the inclusion of the support element.

It is advantageous to utilize a longitudinally slotted clamping tube which is preferably made of rust-proof material as the C-shaped clamping element.

Depending upon the manner of application of the device, it may be advantageous to provide in the device auxiliary means for mounting or fastening thereof. Accordingly, this may be accomplished in a simple manner inasmuch as the C-shaped clamping element may extend to project over both ends of the casing in the operative position thereof. The resulting free ends may be utilized, for example, for suspending or fastening the device in a cable duct or shaft. If a free space is formed within the element as a result of shrinkage and the placement of the suppot element at the gap edges of the C-shaped element, this space may be additionally utilized for passing therethrough of elements such as for example tensioning wires, support wires or other similar elements.

In an especially advantageous further development of the invention, the casing is provided at its periphery with a plurality of fastening elements which are directed inwardly and which can be combined in various ways. By providing a plurality of inwardly directed fastening elements which may be joined in the position of operation in different ways, it is possible to achieve a simple adjustment to different cable sleeve sizes or other elements to be enclosed, such as tubes, ropes, cables or the like.

It has been found particularly advantageous if the casing is provided with a plurality of smaller bulges which are arranged in parallel. As a result, by engagement of the respective smaller bulges within the larger bulge and the possibility for sequentially cutting off the projecting portions, the casings may be adjusted to any desired size thereby making storage especially simple and convenient without posing problems as regards the manufacturing techniques involved. Moreover, additional bulges will not negatively affect the assembly because smaller bulges which are circumferentially more remote from the point of separation will disappear during the shrinking procedure.

Finally, it will be found advantageous to insert the support element in the smaller bulge beforehand, i.e. in the course of the factory production procedures, so that the assembly at the point of use will be simplified.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
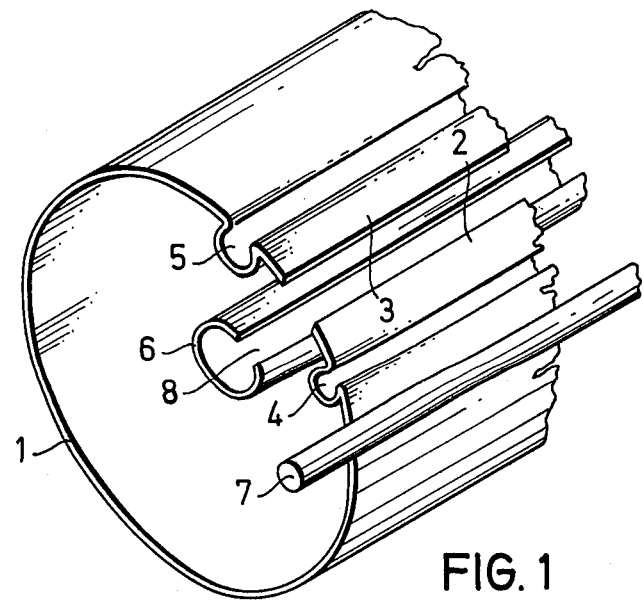
FIG. 1 is a schematic perspective view, broken away, showing a device in accordance with the present invention.
Figure 2:
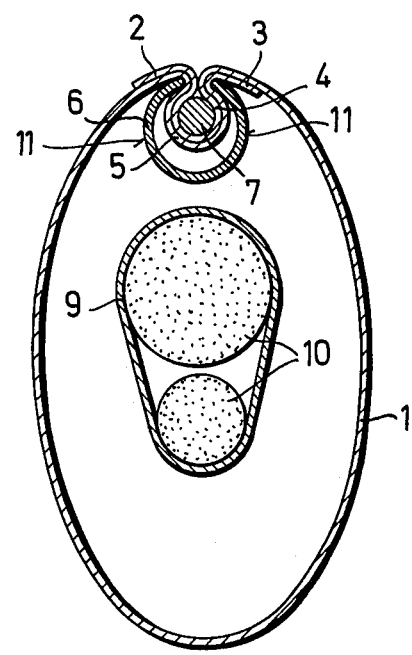
FIG. 2 is a sectional view taken through a device in the assembled state.
Figure 3:
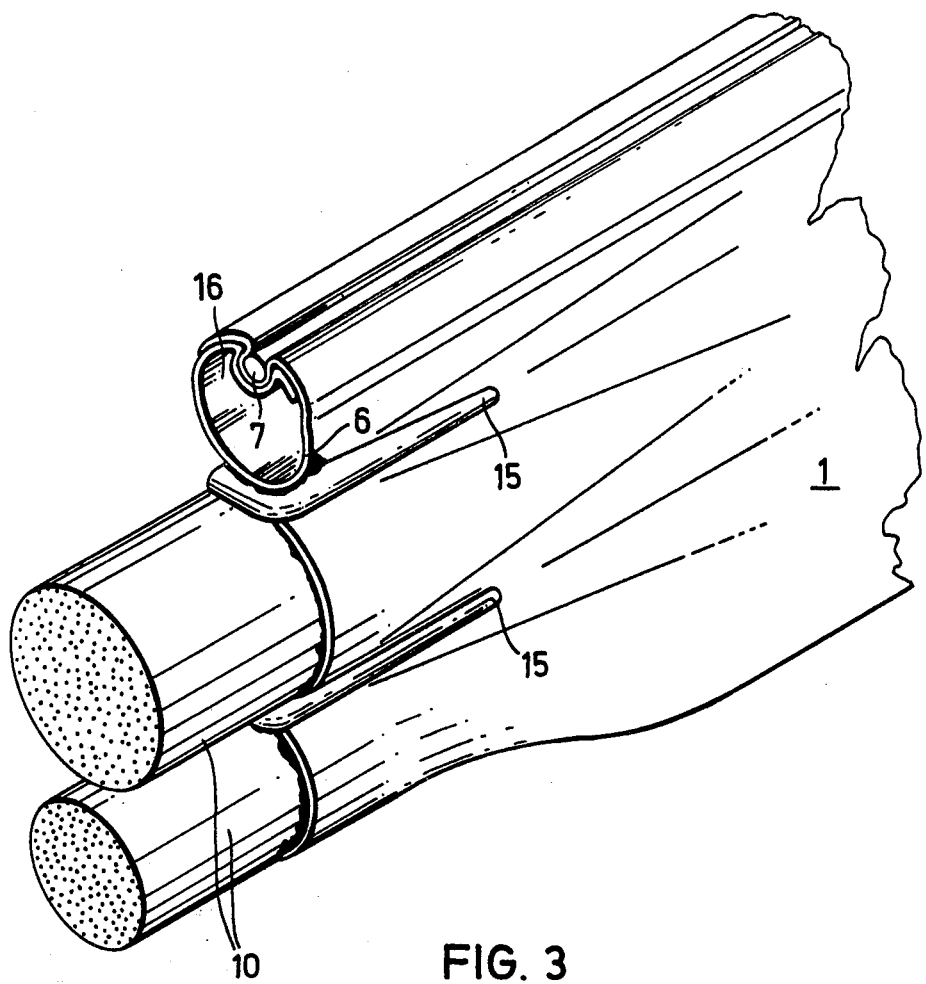
FIG. 3 is a perspective view showing an edge region of an assembled device in the position of use.

Referring now to the drawings, and particularly to FIGS. 1-3 wherein a first embodiment of the invention is depicted, the sealing assembly of the invention is essentially shown as comprising a slotted sheath or casing 1 which consists of a thermally shrinkable plastic material and which is provided with longitudinal edges 2 and 3 whereby the casing 1 is defined with a slotted configuration.

A smaller bulge or protuberant fastening element 4 is formed adjacent the longitudinal edge 2 and a larger bulge or protuberant fastening element 5 is formed an appropriate distance adjacent the other longitudinal edge 3. The bulges 4 and 5 are dimensioned in such a way that, during assembly of the device, the larger bulge 5 may engage over the smaller bulge 4 with a snap fit.

The casing 1 is formed with a constant thickness throughout the regions thereof and even in the regions of the bulges 4 and 5 the constant thickness dimension is maintained. As previously mentioned, this will significantly simplify the manufacture of the casing because, for this purpose, it is only necessary to form the bulges 4 and 5 by means of appropriate dies after the casing has been formed in a planar state.

A C-shaped additional assembly element 6 is shown in FIG. 1 and a support element constructed as a support wire 7, whose function will be explained in greater detail hereinafter, is also shown in FIG. 1.

During assembly of the device, the bulge 4 is snapped into the bulge 5. Both bulges may then be snapped through a gap 8 formed in the C-shaped element 6 or the element 6 may be passed over the bulges 4 and 5 by sliding engagement thereon so as to enclose the bulges. The gap 8 is preferably formed to be wider than the thickness at the constricted portions of the bulges. Subsequently, the support wire 7 is inserted into the internal space formed by the bulge 4. This state of assembly of the device is illustrated in FIG. 2.

During the shrinkage operation, the casing 1 will initially enclose a support insert 9 which surrounds cables 10, as shown in FIG. 2. Subsequently, the casing 1 will rest against the outer wall 11 of the C-shaped element 6 and in this manner there occurs a clamping together of the casing edges resulting from shrinkage of the casing. When the shrinkage procedure is increased, the support wire 7 is lifted due to shrinkage forces exerted by the casing with the tendency to draw the bulges 4, 5 through the gap 8, and clamps the edge regions of the casing against the edges of the gap 8. As a result, a casing will be obtained which is tight on all sides.

In FIG. 3, an end portion of the device in accordance with the invention is depicted. FIG. 3 shows that, in the position of use or in the operative condition of the assembly, there may be arranged clamping clips 15 between the outwardly extending cables 10 and the tube 6 which will have a positive influence on the shrinking procedure of the casing 1 in the desired manner.

In order to insure tightness of the casing 1, the edge regions which bear against each other and/or the surfaces of the cables and the tubes may be provided with a coating of thermoplastic adhesive. Simultaneously, a hollow space 16 of the C-shaped element 6 which is created in the assembly may be utilized for additional functions of the assembly such as, for example, suspending the entire device at a desired location.

Of course, the embodiments described may be modified in various manners within the basic scope and concepts of the present invention. For example, instead of bulges in the longitudinal edges of the casing in accordance with the embodiment of FIGS. 1-3, thickened or bulge-like fastening edges may also be provided which may be connected or pressed together by means of the C-shaped element. Moreover, the invention is not limited to a special profile of the essentially C-shaped element. Aside from the slotted, round tube depicted in accordance with the embodiment shown in FIGS. 1-3, this element may also be oval with the slot being provided in the region of greatest radius of curvature in order to increase the effective bearing surfaces for the edge regions of the casing. Also, the profile may be a portion of a circle or a circular segment.

Furthermore, the C-shaped element itself may be bent into a U-shape wherein the legs of the U-shape represent the effective regions of the element while the bight portion of the U-shaped configuration may be used for example for suspension purposes.

As a result of this design, it is possible to arrange cable sleeves in pairs.

It should be understood that the invention is especially not limited to specific use in cable sleeves and it is, on the contrary, also capable of being utilized in connection with other continuous objects such as tubes, cables, ropes or the like. For example, the invention offers the possibility of enclosing cable or rope joints, or splices and the like, and for attaching additional sealing sleeves in tube branchings or similar structures.

While specific embodiments of the invention have been shown and described in detail to illustrate the application of the inventive principles, it will be understood that the invention may be embodied otherwise without departing from such principles.

What is claimed is:

1. An assembly encasing in a sealed arrangement an item such as a cable or the like comprising:

an essentially tubular slotted casing consisting essentially of thermally shrinkable material having a pair of longitudinal edges;

said casing being shrunk by application of heat thereto to encase in sealing engagement therein said item;

first and second fastening means extending longitudinally of said casing alongside each of said longitudinal edges, respectively; and a tubular annular slotted clamping element arranged with a pair of longitudinal clamping edges engaging therebetween both said first and second fastening means to hold said fastening means together during formation of said assembly;

said clamping element being encased within said casing thereby to enhance the clamping effect of said clamping element upon said fastening means by the action thereon of said heat shrunk casing.

2. An assembly according to claim 1 wherein said clamping element comprises a longitudinally slotted clamping tube made of rust proof material.

3. An assembly according to claim 1 wherein in the position of operation of said assembly said clamping element projects beyond said casing at both ends thereof.

4. An assembly according to claim 1 wherein said first and second fastening means comprise a pair of bulges formed integrally in said slotted casing adjacent the edges thereof, said bulges having different sizes with one of said bulges being smaller and the other being larger and with said smaller bulge being engaged with a snap fit in said larger bulge when said longitudinal edges of said slotted casing are connected together.

5. An assembly according to claim 4 further comprising a support element arranged within said smaller of said bulges.

6. An assembly according to claim 5 wherein said clamping edges define a gap therebetween and wherein said support element is circular and has a diameter greater than the width of said gap.

7. An assembly according to claim 4 wherein said smaller bulge is formed as a plurality of bulges arranged to extend parallel to each other.

8. An assembly according to claim 1 wherein said clamping element is formed with a C-shaped configuration.

* * * * *